US011520029B2

(12) United States Patent
Buddendick et al.

(10) Patent No.: US 11,520,029 B2
(45) Date of Patent: Dec. 6, 2022

(54) METHOD FOR ASCERTAINING MISALIGNMENT OF A RADAR SENSOR

(71) Applicant: Robert Bosch GmbH, Stuttgart (DE)

(72) Inventors: Hermann Buddendick, Sindelfingen (DE); Markus Schlosser, Jockgrim (DE)

(73) Assignee: Robert Bosch GmbH, Stuttgart (DE)

( * ) Notice: Subject to any disclaimer, the term of this patent is extended or adjusted under 35 U.S.C. 154(b) by 266 days.

(21) Appl. No.: 16/822,311

(22) Filed: Mar. 18, 2020

(65) Prior Publication Data

US 2020/0309937 A1 Oct. 1, 2020

(30) Foreign Application Priority Data

Apr. 1, 2019 (DE) .................... 102019204604.5

(51) Int. Cl.
*G01S 13/44* (2006.01)
*G01S 13/931* (2020.01)
*G01S 13/00* (2006.01)

(52) U.S. Cl.
CPC ........ *G01S 13/4418* (2013.01); *G01S 13/449* (2013.01); *G01S 13/931* (2013.01)

(58) Field of Classification Search
None
See application file for complete search history.

(56) References Cited

U.S. PATENT DOCUMENTS

| 7,443,335 B2 * | 10/2008 | Kai ................. | G01S 13/931 342/147 |
| 9,500,742 B2 * | 11/2016 | Poiger ................ | G01S 13/931 |
| 2005/0116854 A1 * | 6/2005 | Beez ................. | G01S 13/931 342/107 |
| 2015/0070207 A1 * | 3/2015 | Millar ................ | G01S 13/931 342/174 |

FOREIGN PATENT DOCUMENTS

| EP | 2549289 A2 * | 1/2013 | ........... G01S 13/931 |
| EP | 3104189 A1 * | 12/2016 | ........... G01S 13/931 |
| EP | 3239737 A1 * | 11/2017 | ........... G01S 13/931 |
| GB | 2363016 A * | 12/2001 | ........... G01S 13/931 |

* cited by examiner

*Primary Examiner* — Bernarr E Gregory
(74) *Attorney, Agent, or Firm* — Norton Rose Fulbright US LLP; Gerard Messina

(57) ABSTRACT

A method for detecting misalignment of a radar sensor positioned on a vehicle. A Doppler spectrum for the radiation emitted and received by the radar sensor is ascertained. For at least one frequency bin of the Doppler spectrum, an angle of incidence is determined in at least a subinterval. The determined angle of incidence is compared to the angle of incidence expected for the frequency bin. A misalignment of the radar sensor is detected as a function of the difference of the measured angle of incidence from the expected angle of incidence.

12 Claims, 6 Drawing Sheets

METHOD FOR ASCERTAINING MISALIGNMENT OF A RADAR SENSOR

CROSS REFERENCE

The present application claims the benefit under 35 U.S.C. 119 of German Patent Application No. DE 102019204604.5 filed on Apr. 1, 2019, which is expressly incorporated herein by reference in its entirety.

FIELD

The present invention relates to a method for detecting misalignment of a radar sensor positioned on a vehicle. In addition, the present invention relates to a sensor set-up, a computer program and a machine-readable storage medium.

BACKGROUND INFORMATION

Due to the growing level of automation in vehicles, the number of installed radar sensors in the vehicles is continuously increasing. In particular, a plurality of radar sensors are regularly installed per vehicle. For example, distance control and object recognition may be implemented, using the radar sensors.

In an increasing number of radar sensors, manual alignment of each radar sensor is cumbersome and cost-intensive. Therefore, the radar sensors used at present are simply inserted into the respective mounting supports without alignment.

Calibration of radar sensors at the end of the assembly line is omitted more and more often, as well. Calibration is carried out by measuring the alignment of the radar sensors. Instead, it is increasingly required that in normal vehicle operation, the radar sensor determine its alignment itself within the shortest possible time. In this manner, changes in the alignment of the radar sensors in their mounting support, such as after being bumped during parking, may also be detected.

Methods for simultaneously estimating the independent speed of the vehicle, using a radar sensor, as well as aligning this radar sensor with respect to the direction of travel and, therefore, determining its misalignment with respect to the nominal position, are conventional. The estimation is carried out, using targets or objects classified as stationary. In this context, the angle of incidence of the reflected radar beams is compared to the measured relative speed. If a stationary object is not situated directly in the direction of travel, then its speed relative to the radar sensor decreases by the cosine of the corresponding angle.

However, in the conventional methods, complex averaging over time is necessary due to a low speed resolution and angular resolution. In addition, the classification of the objects increases the computational expenditure of an analysis of the measurement data of radar sensors.

Furthermore, dedicated radar systems, which may determine, apart from a speed of motion, the moving direction, as well, are also conventional. However, in this manner, it is not possible to estimate the misalignment of the radar sensor, which is separated physically from it and is, for example, for the driver assistance functions.

SUMMARY

An object of the present invention is to provide a rapid and precise method for ascertaining misalignment of a radar sensor.

This object is achieved in accordance with example embodiments of the present invention. Advantageous refinements of the present invention are described herein.

In accordance with the present invention, an example method for detecting misalignment of a radar sensor positioned on a vehicle is provided. In this context, a Doppler spectrum for the radiation emitted and received by the radar sensor is ascertained. For at least one frequency bin of the Doppler spectrum, an angle of incidence is determined in at least a subinterval. The determined angle of incidence is compared to the angle of incidence expected for the frequency bin. The expected angle of incidence is stored, e.g., in a data storage unit. A misalignment of the radar sensor is detected as a function of the difference of the measured angle of incidence from the expected angle of incidence. In addition, the difference may be used as a measure of the misalignment.

In one variant of the present invention, an angle of incidence is determined for each of a plurality of frequency bins of the Doppler spectrum. The angles of incidence determined are compared to the expected angles of incidence of the frequency bins. The difference between the angles of incidence determined and the expected angles of incidence is used for detecting misalignment of the radar sensor and, in particular, for ascertaining a measure of the misalignment of the radar sensor.

In one variant of the present invention, the radar sensor has a plurality of transmitting and/or receiving antennae; the angle of incidence of the at least one frequency bin being determined with the aid of the transmitting and/or receiving antennae. In particular, echo time differences of the received signals of the individual receiving antennae may be used, in order to determine the angle of incidence of the frequency bin. In the frequency range, the echo time difference corresponds to a phase difference, which may be ascertained separately for each frequency bin.

In one variant of the present invention, the subinterval has a frequency spectrum, in which Doppler frequencies are contained that correspond to a speed range between 0 and the speed of the vehicle.

In one variant of the present invention, the subinterval is determined as a function of a moving direction of the vehicle, a nominal alignment, as well as a beam angle of the radar sensor.

In one variant of the present invention, the moving direction of the vehicle is ascertained by at least one sensor on the vehicle, and/or interim deviations from straight-ahead travel are compensated for by an average over time.

In one variant of the present invention, the angle of incidence determined for a frequency bin is dominated by the power reflected by at least one stationary object; the frequency bin being determined by the relative speed between the radar sensor and the stationary object.

In one variant of the present invention, for the average difference between the determined angles of incidence and the expected angles of incidence, both a quality of the determined angles of incidence and values of the determined angles of incidence are considered.

The quality of the determined angles of incidence may be determined, using an estimate of the probability that the determined angle of incidence actually exists. The probability of existence may be used directly for weighting.

The analysis of the difference between a determined angle of incidence and an expected angle of incidence may take place for each frequency bin in a predefined frequency interval for Doppler frequencies, which corresponds to all potentially measurable, relative speeds of the stationary objects that are caused by the speed of the vehicle. The accuracy of the determination of the difference may be increased by averaging the differences of a plurality of frequency bins.

In one variant of the present invention, in the case of the averaged difference, the differences of the ascertained angles of incidence from the expected angles of incidence of the frequency bins having a greater angle of incidence relative to the direction of travel are weighted more heavily than the differences of the ascertained angles of incidence from the expected angles of incidence of the frequency bins having a lower angle of incidence. To that end, corresponding graphs or characteristic curves or formulas may be provided, which determine the factors for the differences for different expected angles of incidence. The graphs, characteristic curves or formulas are stored, e.g., in a storage device of the control unit.

In order to take into account the value of the angle of incidence, frequency bins having large angles φ to direction of travel F may be weighted more heavily, since in the case of large angles φ, a small change in angle Δφ already produces a relatively large change in relative speed $v_{r1}$, $v_{r2}$, and therefore, in the Doppler frequency. For example, abs (sin(φ)) may be used as a weighting function. In this case, this is the angle φ to the direction of travel. This is calculated from the angle of incidence so as to be matched to the installation position.

In one variant of the present invention, in the case of the averaged difference, the differences of the ascertained angles of incidence from the expected angles of incidence of the frequency bins, which lie above a predefined limiting value, are not considered. In this manner, differences in frequency bins, which have been generated by moving objects, may be excluded. For example, the limiting value is determined experimentally in advance and is stored, e.g., in a storage device of the control unit.

For example, from the cosine effect, a separate range for the angles of incidence to be expected may also be calculated for each frequency bin in the Doppler spectrum. If the measured value lies outside of this range, it is not considered. Alternatively, however, a constant upper limit (such as 5° or) 10° may simply be used for the allowed difference, as well.

According to a further aspect of the present invention, a control unit is provided, which is configured to execute the method.

According to a further aspect of the present invention, a computer program is provided. The computer program includes commands that, in response to the execution of the computer program by a computer or a control unit, cause it to perform a method.

Furthermore, according to one aspect of the present invention, a machine-readable storage medium is provided, in which the computer program is stored.

The independent speed of the vehicle may be determined with the aid of an analysis of the Doppler spectrum. This may be carried out independently of the exact installation situation of the radar sensor (that is, alignment and possible misalignment). This utilizes the fact that viewed from the radar sensor, no stationary object may move relatively more rapidly than the speed of motion of the vehicle. Accordingly, an abrupt decline in power in the Doppler spectrum is sought in the case of the (negative) independent speed of the vehicle.

If the measured angle of incidence is considered in addition to the power, this also allows the moving direction to be estimated in addition to the speed of motion. In this context, the moving direction relates to the direction of the beam of the radar sensor. Accordingly, to determine misalignment, the moving direction must still be compared to the current moving direction of the vehicle and corrected by the nominal position of the radar sensor.

The moving direction of the vehicle may be determined with the aid of an additional sensor on the vehicle. Alternatively, however, it may also be assumed that a vehicle travels approximately straight ahead most of the time. Thus, the changes in direction of the vehicle may also be compensated for by viewing, that is, by averaging them over time.

Misalignment of the radar sensor may be determined by comparing a moving direction ascertained by the radar sensor and a moving direction supplied by the vehicle, that is, ascertained by a further sensor. In this manner, automated misalignment detection may be provided, which may obviate previous alignment or calibration of radar sensors. Consequently, vehicle systems based on radar sensors, such as assistance systems, may be built more inexpensively.

In the case of the transmitted signal, which is generated by the radar sensor and has a constant frequency, only the Doppler effect produces a difference between the transmitting and receiving frequency. In this case, the distance of an object does not matter. Thus, each relative speed corresponds to a Doppler frequency. Therefore, based on the speed of motion, a specific frequency interval in the Doppler spectrum may be determined, for which a more exact analysis of the angles of incidence is useful.

In addition to the power analysis, a simple angle analysis may be carried out for a plausibility check. Stationary objects having the highest relative speed (that is, the vehicle speed) are situated directly in the direction of travel. Thus, for a front radar sensor, it may be assumed, independently of a slight misalignment, that in the case of the (negative) vehicle speed, the receiving angle should be approximately zero. Ultimately, both the horizontal and the vertical offset must be zero for objects "directly ahead."

However, for the rest of the speed interval, all of the points on a cone oriented axially symmetrically about the direction of travel have the same relative speed with respect to the radar sensor. Therefore, in principle, the power of stationary objects having an infinite number of combinations of horizontal and vertical offset may be superposed in a so-called frequency bin of the Doppler spectrum.

As long as one of the two beam angles of the radar sensor is only a few degrees, the cosine effect in this direction is negligible. For example, the cosine of 8° corresponds to a value of 0.99. Through this, for example, the cosine effect with regard to an elevation angle of the radar sensor may be negligible. In this manner, the three-dimensional cone may be reduced to its two lines of intersection with the "horizontal" sensor plane.

According to one specific embodiment of the example method according to the present invention, the radar sensor positioned on a vehicle has a plurality of transmitting and/or receiving antennae, in order to determine the angles of incidence.

According to a further specific embodiment of the example method according to the present invention, the direction of travel of the vehicle is ascertained by at least one sensor on the vehicle. Thus, most vehicles include rate-of-rotation and yaw-rate sensors, for example, for electronic stability programs. These vehicle sensors may be coupled to the control unit so as to be able to transmit data, or connected indirectly via existing control units. Through this, the control unit may read out and evaluate the vehicle sensors directly or use the measurement data provided by a further control unit.

Alternatively, or in addition, interim deviations from straight-ahead travel may be compensated for by averaging over the time. It may be assumed that a vehicle travels straight ahead most of the time. An angular offset may be calculated by comparing the moving direction ascertained by the radar sensor and the moving direction ascertained by the vehicle sensors mentioned above. This angular offset is compared to the angular offset to be expected for the nominal position. If the difference exceeds, for example, a specified limiting value, misalignment is detected by the control unit. Therefore, misalignment of the radar sensor may be defined as a deviation from a nominal installation.

According to a further specific embodiment of the example method according to the present invention, the radar sensor positioned on a vehicle is situated at a front end of the vehicle, a rear end of the vehicle, or a side of the vehicle. In addition, radar sensors configured as corner sensors may also be used.

Regarding the estimation of misalignment, radar sensors installed on the sides and in the corners have the advantage that objects on the opposite side of the vehicle are often not in their field of view. Accordingly, only one line of intersection with the "horizontal" sensor plane remains for the angle analysis, and the angle of observation is unequivocally predictable for each relative speed. This simplifies the angle estimation and increases the accuracy of the misalignment estimate.

In addition, for this class of sensors, due to their being installed rotated with respect to the direction of travel, even at large angles to the direction of travel, a large amount of power may be received from stationary objects. This results from the fact that the corresponding observation angles lie in a major lobe of a transmitting antenna of the corner sensors and/or detect the objects while driving by them, using the major lobe. This additionally increases the accuracy of the misalignment estimate. Thus, a single relative speed does not correspond exactly to a frequency bin in the Doppler spectrum, but a small interval of speeds does. However, due to the steep curve of the cosine function for angles markedly different from zero, this slight ambiguity in the speed becomes noticeable less markedly in a corresponding ambiguity of the receiving angle.

Finally, for this class of radar sensors, even objects situated laterally at the rear may still be in the visual range. Thus, the frequency/speed range to be analyzed extends in the direction of positive relative speeds. Through this, namely, in addition to the magnitude of the independent speed, the interval of the analyzable Doppler frequencies is also determined by the beam angle and installation angle of the respective radar sensor.

Radar sensors configured as rear sensors may be considered in a manner analogous to front sensors; the inverted algebraic signs of the independent speeds being taken into account.

If the initial assumption is violated and the assumed independent speed is not exactly correct, this results in an additional offset, which changes from one frequency bin to the next. This does make a more accurate analysis necessary, but in this manner, an independent speed assumed in such a way may still be corrected later, as well.

According to a further specific embodiment of the example method according to the present invention, the radiation of the radar sensor emitted by at least one radar antenna has a small vertical beam angle and/or a vertical transmission angle with respect to an undersurface of the vehicle. In this manner, starting out from an undersurface of the vehicle, the antenna may emit the transmission power at a slight angle upwards. This may additionally minimize the influence of the roadway.

The reflected power of all stationary objects, which are situated at a certain angle to the direction of travel (and/or a small interval around it), falls into the same frequency bin in the Doppler spectrum, since they have the same relative speed with respect to the sensor. All objects in the range of the radar sensor may be situated on the surface of a cone open in the direction of travel. Thus, for example, an infinite number of combinations of azimuthal and elevation angles are produced. If the radar sensor only scans the horizontal plane, then the cone is reduced to the two lines of intersection with this plane. Therefore, the remaining (azimuthal) angle is unique right down to the algebraic sign. The objects may only be situated at the same angle to the left or right of the direction of travel. Finally, for corner radars, even this ambiguity is often removed, since the opposite side is not in the visual range of the radar sensor.

The more different angles of incidence overlap in a frequency bin, the more difficult the angular estimation may be. However, two angles may be determined simultaneously in a reliable manner. In addition, it is advantageous to already know the expected angle beforehand. This may be implemented, for example, by limiting the search region.

According to a further specific embodiment of the present inventional, the difference between the determined angles of incidence and the expected angles of incidence averaged by the control unit over all of the analyzed frequency bins is considered as both a quality and the absolute value of the angle of incidence determined in a frequency bin. In addition, large differences in individual frequency bins indicate that the power in this frequency bin is dominated by a moving object, which means that these should not be taken into account in the averaging.

According to one refinement of the present invention, a method for detecting misalignment of a radar sensor on a vehicle is provided. In one step, a moving direction of the radar sensor positioned on a vehicle is ascertained by the radar sensor. Subsequently or concurrently to this, a moving direction of the vehicle is ascertained by at least one acceleration sensor on the vehicle. A comparison may be carried out by a control unit on the basis of the moving directions of the vehicle ascertained independently of each other. If a difference of the two ascertained moving directions is determined, misalignment is detected by the control unit.

Below, preferred exemplary embodiments of the present invention are explained in greater detail in light of highly simplified, schematic representations.

DETAILED DESCRIPTION OF EXAMPLE EMBODIMENTS

Figure 1:
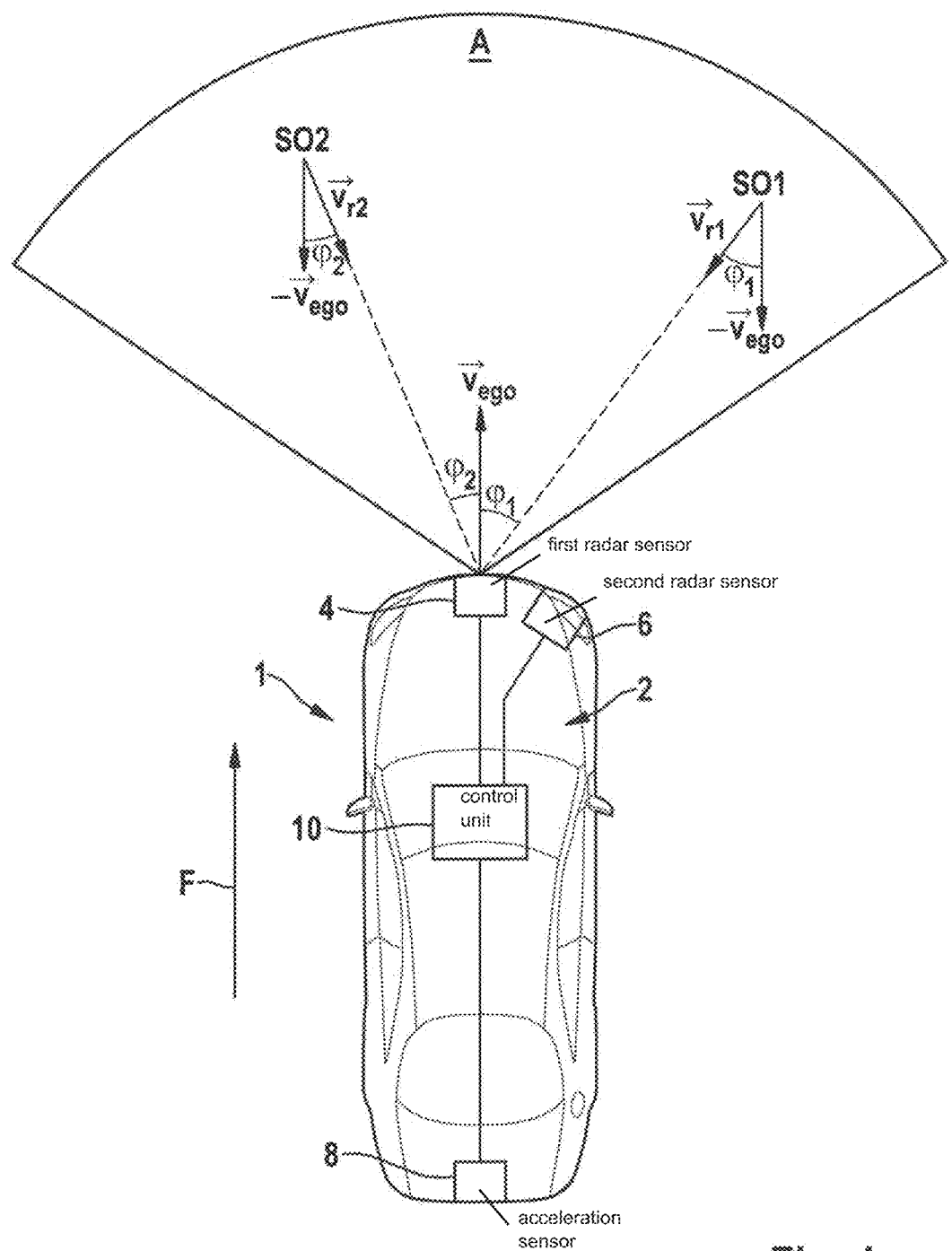
FIG. 1 shows a schematic representation of a vehicle having a sensor system, in the case of straight-ahead travel of the vehicle.

In the figures, identical structural elements have, in each instance, the same reference numerals.

FIG. 1 shows a schematic representation of a vehicle 1 having a sensor system 2, in the case of straight-ahead travel of vehicle 1. According to the exemplary embodiment, sensor system 2 includes a first radar sensor 4, which is positioned on a vehicle front end. A second radar sensor 6 is configured as a corner sensor and is positioned at a transition between the vehicle front-end and a right side of vehicle 1 in direction of travel F.

In addition, sensor system 2 includes an acceleration sensor 8 on the vehicle. Sensors 4, 6, 8 of sensor system 2 are coupled to a control unit 10 so as to be able to transmit data. Through this, the control unit may read out sensors 4, 6, 8, evaluate the measured values of the sensors, and implement a method for ascertaining misalignment of at least one of radar sensors 4, 6.

For the sake of clarity, only scanning range A of first radar sensor 4 is shown. Two objects SO1, SO2, which are positioned asymmetrically relative to vehicle 1, are situated in scanning range A.

From the point of view of vehicle 1, stationary objects SO1, SO2 move towards vehicle 1 at a speed $v_{ego}$. For objects SO1, SO2 having a lateral (but also vertical) offset, relative speed $v_{r1}$, $v_{r2}$ decreases by the cosine of angle $\varphi_1$, $\varphi_2$ to direction of travel F. All in all, relative speeds $v_{r1}$, $v_{r2}$ are therefore distributed on the interval $[-v_{ego}; 0]$.

For a radar sensor 4 oriented exactly forwards, in the case of straight-ahead travel, the angle to the direction of travel, that is, to the moving direction of vehicle 1, corresponds directly to the observation/receiving angle:

$$\varphi = \varphi_{motion} = \varphi_{observer} = \varphi_1 \text{ and/or } \varphi_2$$

For the two azimuth angles $\varphi_1$, $\varphi_2$, which belong to a particular relative speed, that is, Doppler frequency, due to the cosine effect, the following applies in this case:

$$\varphi_1, \varphi_2 = +/- \arccos(-v_r/v_{ego})$$

Figure 2:
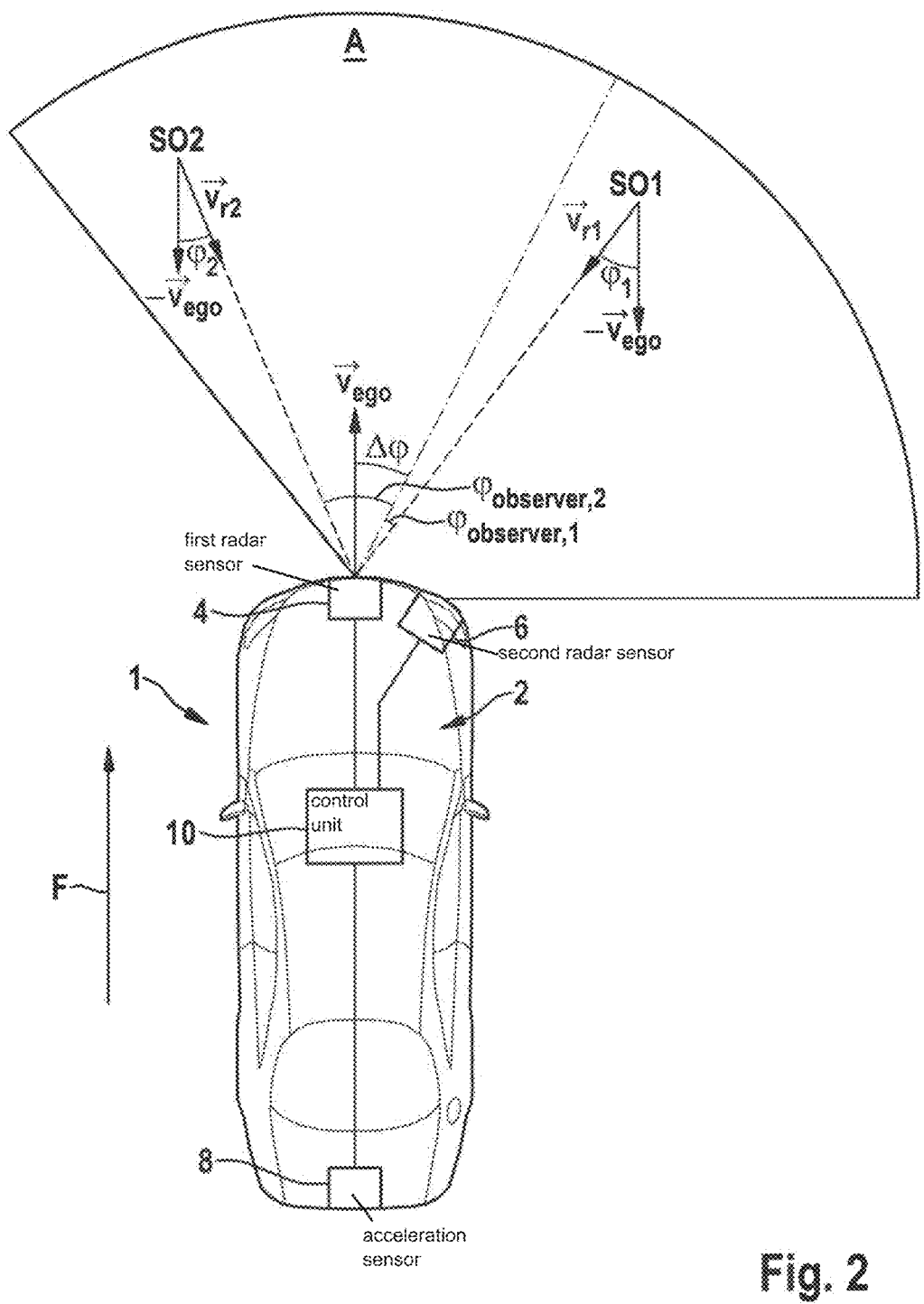
FIG. 2 shows a schematic representation of a vehicle having a sensor system, where a radar sensor is mounted so as to be incorrectly rotated.

In FIG. 2, a schematic representation of a vehicle 1 having a sensor system 2 is shown, in which case a radar sensor 4 is positioned so as to be incorrectly rotated.

A horizontal misalignment of radar sensor 4 results mathematically in an angular deviation $\Delta\varphi$:

$$\varphi_{observer1,2} = \varphi_{motion1,2} + \Delta\varphi$$

However, such an angular deviation is produced for a deviation from straight-ahead travel, as well.

Figure 3:
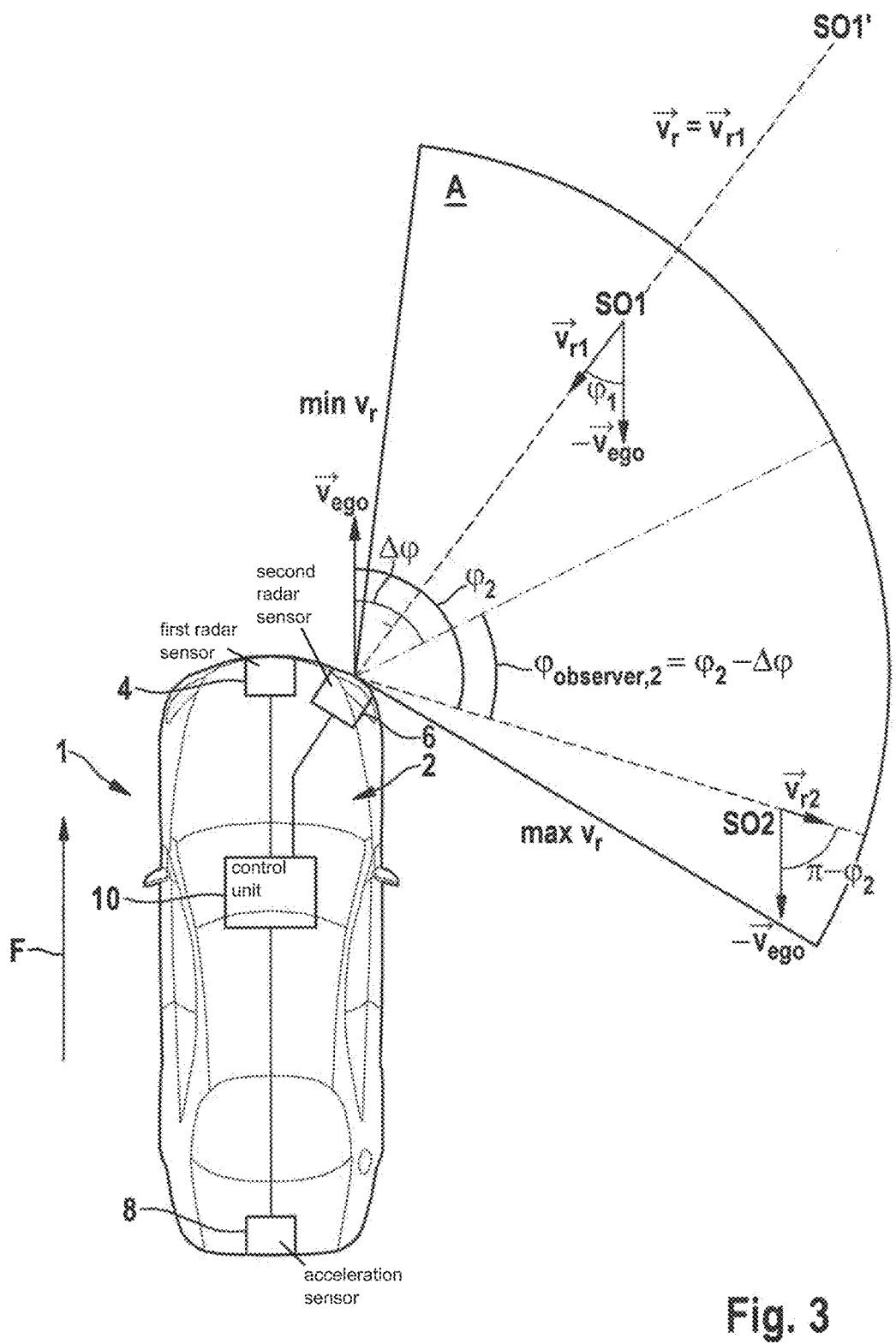
FIG. 3 shows a schematic representation of a corner sensor of the sensor system, in the case of straight-ahead travel.

FIG. 3 shows a schematic representation of a corner sensor 6 of sensor system 2, in the case of straight-ahead travel of vehicle 1. In addition, scanning range A of corner sensor 6 is shown.

Due to an installation position of corner sensor 6 rotated with respect to direction of travel F, a high power of stationary objects SO1, SO2 may even be received at large angles to direction of travel $\varphi_{motion}$ since the corresponding observation angles $\varphi_{observer}$ lie in the major lobe of the antenna.

A further object SO1' is positioned in back of an object SO1, the power reflected back being superposed with the reflected-back power of object SO1. Due to this, the two ascertained powers fall into the same frequency bin in the Doppler spectrum, since they have the same relative speed with respect to sensor 6.

Figure 4:
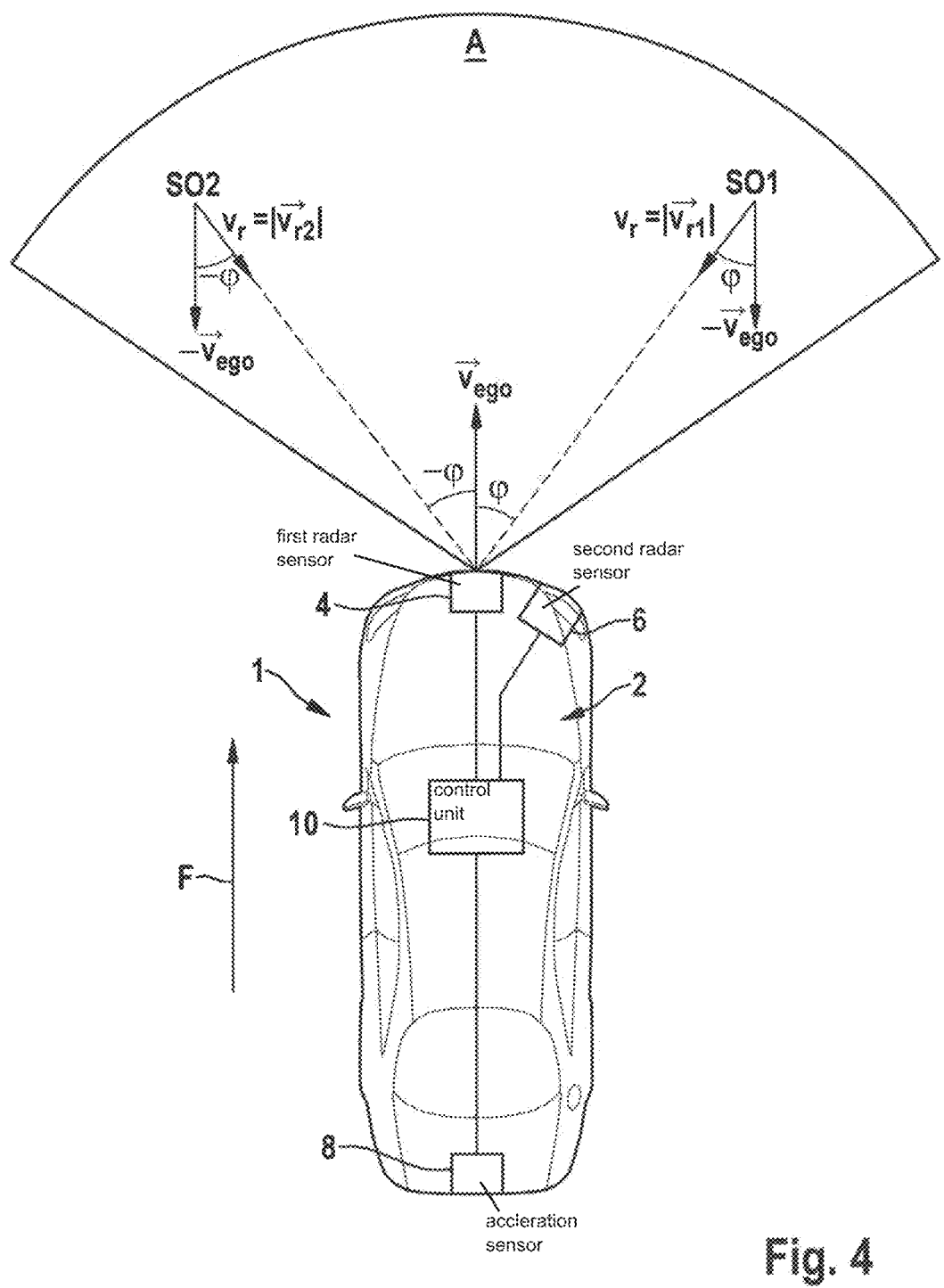
FIG. 4 shows a schematic representation of a vehicle having a sensor system, in the case of straight-ahead travel with objects positioned symmetrically.

FIG. 4 illustrates a schematic representation of a vehicle 1 having a sensor system 2, in the case of straight-ahead travel with objects positioned symmetrically. Due to this, the two objects SO1, SO2 are positioned at a symmetric angle relative to vehicle 1. The following relation results from this:

$$|\varphi_{observer1,2}| = |\varphi_{motion1,2}| = |\varphi_{1,2}|$$

Figure 5:
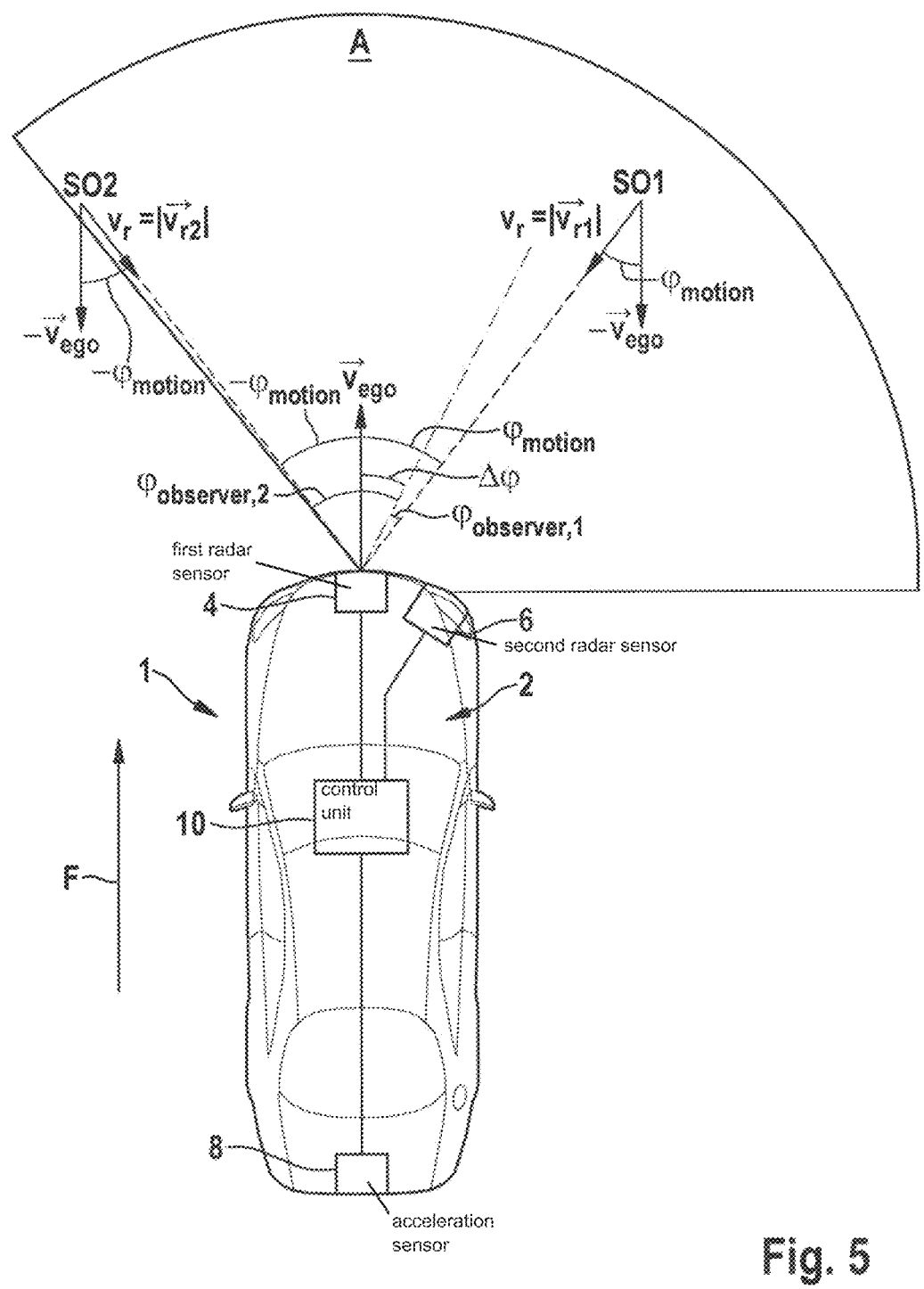
FIG. 5 shows a schematic representation of a corner sensor of the sensor system, where a radar sensor is mounted so as to be incorrectly rotated and objects are positioned symmetrically.

FIG. 5 shows a schematic representation of a front sensor 4 of sensor system 2, where a radar sensor 4 is positioned so as to be incorrectly rotated and objects are positioned symmetrically.

Angles to the direction of travel $\varphi_{motion1,2} = +/- \arccos(-v_r/v_{ego})$ are known beforehand for each analyzed frequency bin and stored in a data storage unit of the control unit. Therefore, the known angles of the frequency bins may be used for detecting misalignment of a radar sensor. To that end, the known angle of a frequency bin is compared to a measured angle of the same frequency bin. An angular deviation $\Delta\varphi$ may be determined from the comparison. Angular deviation $\Delta\varphi$ may be identical for a plurality of frequency bins or for each analyzed frequency bin.

In this connection, a least squares method would provide a solution for combining the values of the individual frequency bins. For example, the following factors may be taken into account in the weighting of these errors:

- quality of the estimate of the observation angles in each frequency bin;
- weighting frequency bins having large angles $\varphi$ to direction of travel F more heavily, since in the case of large angles $\varphi$, a small change in angle $\Delta\varphi$ already produces a relatively large change in relative speed $v_{r1}$, $v_{r2}$, and therefore, in the Doppler frequency (cf. $\cos'(\varphi) = -\sin(\varphi)$);
- in the case of large differences, the angle of incidence may originate from a moving object and consequently be ignored by the control unit.

For example, values of the quality of the estimate of the observation angles for each frequency bin may be stored in a data storage unit of the control unit. In addition, an angle value, which indicates as of when an angle $\varphi$ to direction of travel F is categorized as large and weighted more heavily, may be stored in the data storage unit. Furthermore, an angle value of a large deviation for the angle of incidence may be stored, which indicates that the received signal originates from a moving object and is consequently ignored by the control unit.

In all of these methods, the measured values of the individual frequency bins may also be averaged over time.

If the two angles of incidence $\varphi_{observer1,2}$ of stationary objects SO1, SO2, in a frequency bin, may be determined, previous knowledge of independent speed $v_{ego}$ is not absolutely necessary. Both independent speed $v_{ego}$ of vehicle 1 and the misalignment, that is, direction of travel F, may be determined directly from difference $\Delta\varphi$ and/or the average value of the two observation angles $\varphi_{observer1,2}$.

If $\varphi_{observer1} < 0 < \varphi_{observer2}$, then:

$$v_{ego} = -\cos((\varphi_{observer2} - \alpha_{observer1})/2)/v_r$$

$$\Delta\varphi(\varphi_{observer2} + \varphi_{observer1})/2$$

The movement of vehicle 1 is normally not with respect to sensors 4 and 6, but with respect to the midpoint of a rear axle. However, the movement of any other point on the rigid body, vehicle 1, may be derived from this. In addition, in the case of straight-ahead travel, the movement vector of all points on vehicle 1 is the same.

Misalignment of the radar sensors may also be detected erroneously, if utilized speed $v_{ego}$ of the vehicle differs from the actual speed. Deviation $\Delta\varphi$ from the ideal angle with regard to moving direction $\varphi$ is largest in the vicinity of negative independent speed $v_{ego}$. Therefore, the frequency bins in the Doppler spectrum contain the most information regarding an error in the estimation of the independent speed.

Figure 6:
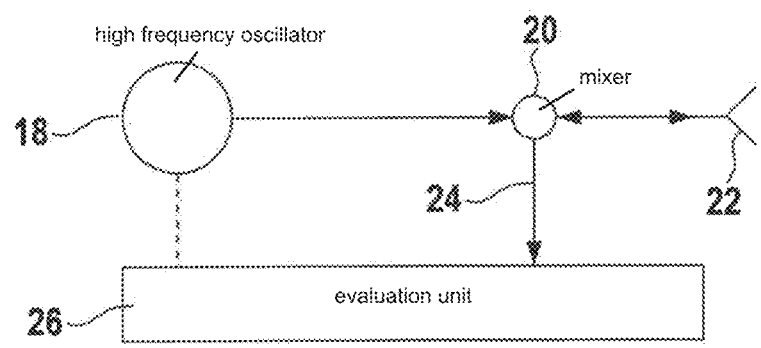
FIG. 6 shows a schematic representation of a radar sensor.

FIG. 6 shows a schematic representation of a block diagram for a radar sensor. A high-frequency oscillator 18 is provided, whose frequency is controllable. High-frequency oscillator 18 generates a transmitted signal, which reaches an antenna 22 via a mixer 20 and is then emitted by the antenna as a radar lobe. The radar echoes generated by objects in the surrounding area of the vehicle are received by antenna 22 and are mixed, in mixer 20, with a component of the transmitted signal generated by high-frequency oscillator 18 at the receiving time. Thus, an intermediate frequency signal 24, which is evaluated further in an evaluation unit 26, is obtained by beating. The frequency of the transmitted signal generated by high-frequency oscillator 18 is modulated and forms a series of CW R-signal ramps having a constant frequency. Thus, it is a CW radar transmission signal. If an elongated object, which is situated at a distance in front of the object, is located, then the interval of the ramps determines the frequency difference of the signals, which are mixed with each other in mixer 20 and produce the frequency of intermediate frequency signal 24. If the vehicle traveling ahead moves relative to the radar sensor, then the frequency difference is a function of a Doppler shift, which, for its part, is a function of the relative speed.

Intermediate frequency signal 24 is initially sampled and digitized as a time signal and then converted to a Fourier spectrum, using, for example, a rapid Fourier transform. In this spectrum, each located object is characterized in the form of a peak at a particular frequency, which is a function of the distance and of the relative speed of the object. If the same object is now located once on the rising ramp and then once more on the falling ramp a little later, then the frequencies of the two peaks may be added. Since the ramps have opposite slopes, the components that are a function of distance cancel each other out in this instance. Thus, only the Doppler component that is a function of the relative speed remains. Conversely, if the frequencies of the two peaks are now subtracted, the components that are a function of speed cancel each other out, and a pure distance component is obtained, which allows the distance of the object to be determined. Normally, more than two modulation sequences or at least two ramps are used, which differ in their slope. This facilitates the assignment of the peaks contained in the spectra to the respective objects, if two or more objects are present.

Evaluation unit 26 is used for analyzing the spectrum of intermediate frequency signal 24. A discrete spectrum of the intermediate frequency signal is used and analyzed for a digital analysis. Accordingly, the frequency axis is split up into a finite number of frequency bins, and the spectrum is a discrete function, which indicates the power apportioned to each frequency bin.

Figure 7:
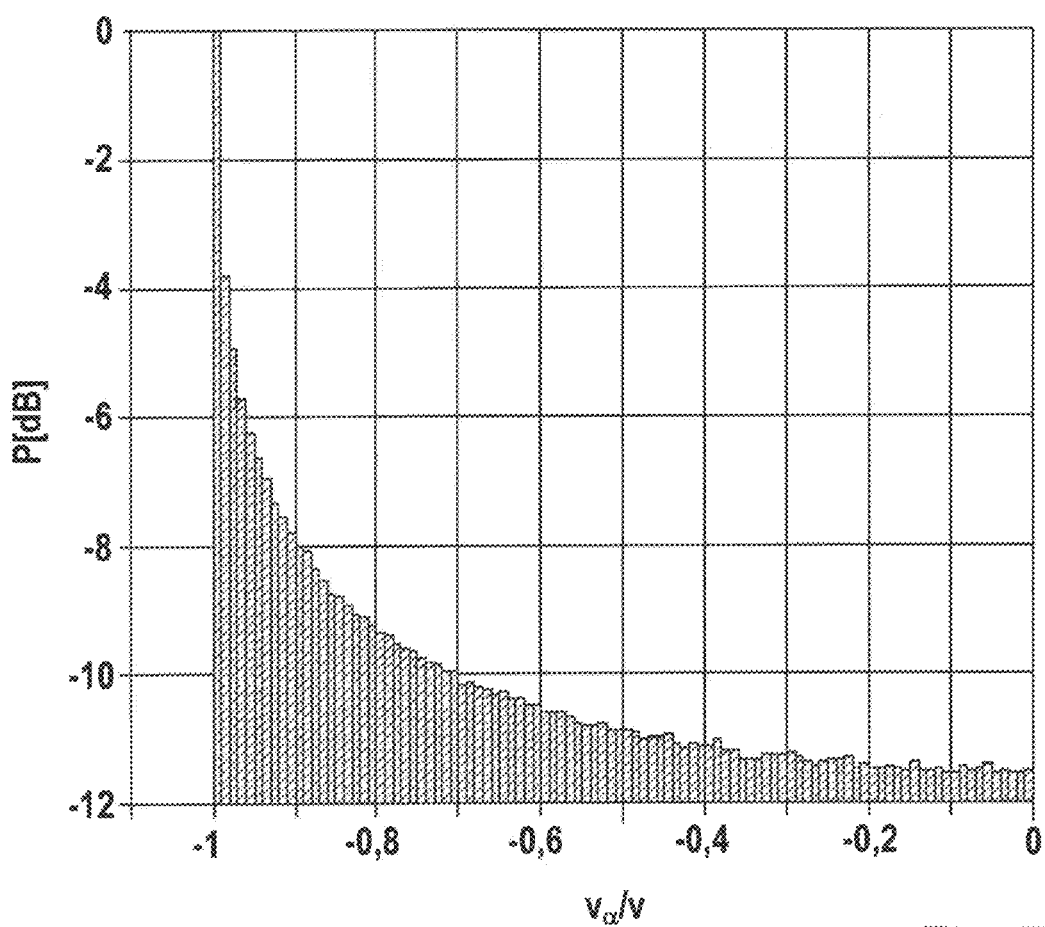
FIG. 7 shows a graph, in which the received power of the reflected and received radar signal is plotted versus relative speed $v_\alpha/v$.

FIG. 7 shows a graph, in which received power P, in decibels (dB), of the reflected radar signal received is plotted versus relative speed $v_\alpha/v$. In this context, angle $\alpha$ determines an angular difference between the direction of travel of the vehicle and the connecting direction to the object. The independent speed of the vehicle is denoted by v. A relative speed of the vehicle with respect to the object is yielded from the following formula: $v_\alpha=-v\cdot\cos(\alpha)$. The quotient of measured relative speed $v_\alpha=-v\cdot\cos(\alpha)$ of the object and independent speed v of the vehicle is indicated on the x-axis. Accordingly, the power reaches a maximum at $v_\alpha/v=-1$. The signal falls abruptly to zero for relative speeds that are even smaller (greater by magnitude).

When angle $\alpha$ approaches the limiting value of 0, the slope of the cosine function becomes smaller and smaller, with the effect that the relative speeds obtained for different angles $\alpha$ become more and more similar to each other, and that therefore, the radar echoes from an increasing number of scattering centers fall into the same frequency bin. The result of this is that the power of the frequency bins increases markedly as the limiting value of −1 is approached more and more. Therefore, the abrupt decrease in the power at a relative speed $v_\alpha/v=-1$ for $\alpha=0$ is so prominent and readily detected in the spectrum.

What is claimed is:

1. A method for detecting misalignment of a radar sensor positioned on a vehicle, the method comprising the following steps:
controlling a transmitting antenna of the radar sensor to emit radiation at a first time that a receiving antenna of the radar sensor receives at a second time after the first time;
ascertaining a Doppler spectrum for the radiation emitted and received by the radar sensor;
determining, for at least one frequency bin of the Doppler spectrum, an angle of incidence in at least a subinterval of a predefined frequency interval;
comparing the determined angle of incidence to an angle of incidence expected for the frequency bin; and
detecting a misalignment of the radar sensor as a function of a difference of the determined angle of incidence from the expected angle of incidence.

2. The method as recited in claim 1, wherein angles of incidence are determined for a plurality of frequency bins of the Doppler spectrum, the determined angles of incidence are compared to expected angles of incidence of the frequency bins, and a difference between the determined angles of incidence and the expected angles of incidence are ascertained as a measure of the misalignment of the radar sensor.

3. The method as recited in claim 2, wherein the radar sensor has a plurality of transmitting and/or receiving antennae, and the angles of incidence of the frequency bins are determined with the aid of the transmitting and/or receiving antennae.

4. The method as recited in claim 2, wherein both a quality of the determined angles of incidence and absolute values of the determined angles of incidence are taken into account for ascertaining an average difference between the determined angles of incidence and the expected angles of incidence.

5. The method as recited in claim 4, wherein in the case of the average difference, the differences of the ascertained angles of incidence from the expected angles of incidence of the frequency bins, which have a greater angle of incidence relative to the direction of travel, are weighted more heavily than the differences of the ascertained angles of incidence from the expected angles of incidence of the frequency bins, which have a lower angle of incidence.

6. The method as recited in claim 4, wherein in the case of the average difference, the differences of the ascertained angles of incidence from the expected angles of incidence of the frequency bins, which are above a predefined limiting value, are not considered.

7. The method as recited in claim 1, wherein the subinterval has a frequency spectrum, in which Doppler frequencies are contained that are generated by a speed range between 0 and a speed of motion of the vehicle.

8. The method as recited in claim 1, wherein the subinterval is determined as a function of a moving direction of the vehicle, a nominal alignment, and a beam angle of the radar sensor.

9. The method as recited in claim 8, wherein the moving direction of the vehicle is ascertained by at least one sensor on the vehicle, and/or interim deviations from straight-ahead travel are compensated for by averaging over the time.

10. The method as recited in claim 1, wherein the angle of incidence determined for the frequency bin is dominated by power reflected by at least one stationary object, the stationary object having a speed relative to the radar sensor that corresponds to the frequency bin.

11. The method as recited in claim 1, wherein the radar sensor emits radiation having a constant transmitting frequency.

12. A non-transitory storage medium on which is stored a computer program for detecting misalignment of a radar sensor positioned on a vehicle, the computer program, when executed by a computer, causing the computer to perform the following steps:
   ascertaining a Doppler spectrum for radiation emitted and received by the radar sensor;
   determining, for at least one frequency bin of the Doppler spectrum, an angle of incidence in at least a subinterval of a predefined frequency interval;
   comparing the determined angle of incidence to an angle of incidence expected for the frequency bin; and
   detecting a misalignment of the radar sensor as a function of a difference of the determined angle of incidence from the expected angle of incidence.

* * * * *